(12) United States Patent
Barba

(10) Patent No.: US 7,841,389 B1
(45) Date of Patent: Nov. 30, 2010

(54) APPARATUS FOR EFFICIENTLY DISTRIBUTING WARM AIR GENERATED BY A STEAM RADIATOR

(76) Inventor: Ralph Barba, 86 Glenwood Rd., Glen Head, NY (US) 11545

( * ) Notice: Subject to any disclaimer, the term of this patent is extended or adjusted under 35 U.S.C. 154(b) by 1211 days.

(21) Appl. No.: 11/447,451

(22) Filed: Jun. 5, 2006

(51) Int. Cl.
*F24H 3/06* (2006.01)
*F01P 7/10* (2006.01)
(52) U.S. Cl. .................................. 165/122; 165/99
(58) Field of Classification Search .......... 165/121, 165/122, 123, 126, 53, 99, 100, 101, 71, 165/81, 72, 299; 454/231, 233, 269, 329; 237/70; 392/360, 361; 236/36, 37
See application file for complete search history.

(56) References Cited

U.S. PATENT DOCUMENTS

| 1,645,140 | A | | 10/1927 | Herbruck | |
|---|---|---|---|---|---|
| 2,022,333 | A | * | 11/1935 | Woolley | 165/54 |
| 2,135,461 | A | * | 11/1938 | Wooley | 454/268 |
| 2,270,823 | A | * | 1/1942 | Meyerhoefer | 165/97 |
| 2,927,780 | A | * | 3/1960 | Seeley | 165/48.1 |
| 3,324,938 | A | * | 6/1967 | Berkoff | 165/299 |
| 4,126,268 | A | * | 11/1978 | Vitale | 236/38 |
| 4,576,331 | A | | 3/1986 | Harwell | |
| 4,870,253 | A | | 9/1989 | De'Longhi | |
| D314,613 | S | | 2/1991 | De'Longhi | |
| 5,489,238 | A | | 2/1996 | Asselbergs | |
| 6,003,596 | A | * | 12/1999 | Barba | 165/299 |
| 6,322,443 | B1 | | 11/2001 | Jackson | |
| 6,808,018 | B1 | * | 10/2004 | Toner | 165/299 |
| 2004/0222309 | A1 | | 11/2004 | Skertich | |

* cited by examiner

*Primary Examiner*—Tho V Duong
(74) *Attorney, Agent, or Firm*—Richard L. Miller

(57) ABSTRACT

An apparatus for efficiently distributing warm air generated by a steam radiator which comprises a booster fan assembly positioned adjacent to the steam radiator. A mechanism is coupled to the booster fan assembly for circulating the warm air away from the steam radiator and out into a room.

7 Claims, 3 Drawing Sheets

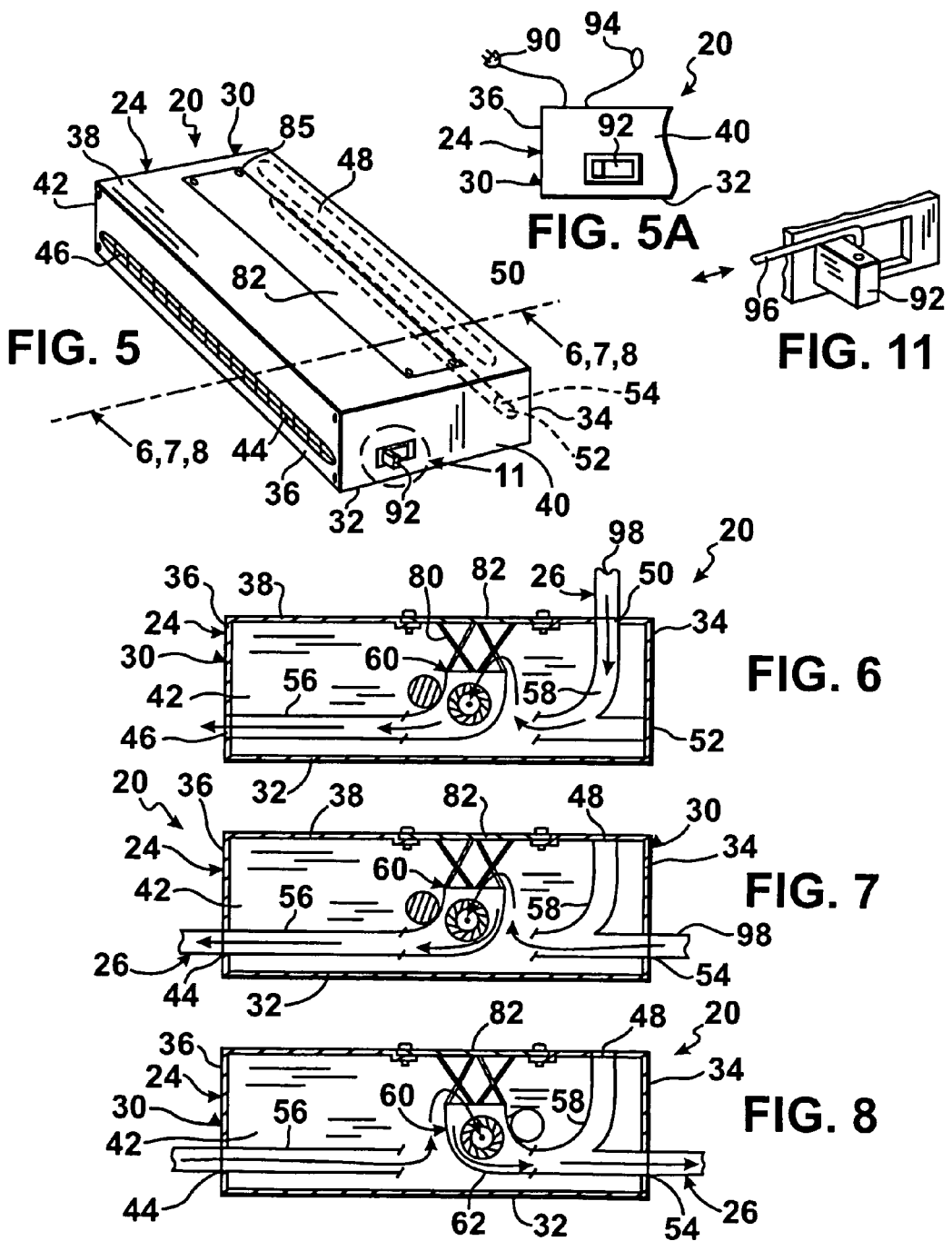

APPARATUS FOR EFFICIENTLY DISTRIBUTING WARM AIR GENERATED BY A STEAM RADIATOR

BACKGROUND OF THE INVENTION

1. Field of the Invention

The present invention relates to a radiator air circulator, and more particularly, an apparatus for efficiently distributing warm air generated by a steam radiator.

2. Description of the Prior Art

Numerous innovations for radiator accessories have been provided in the prior art that will be described. Even though these innovations may be suitable for the specific individual purposes to which they address, however, they differ from the present invention.

A FIRST EXAMPLE, U.S. Pat. No. 1,645,140, Issued on Oct. 11, 1927, to Herbruck teaches in combination in hot air heating apparatus, a portable casing open on the lower side and adapted to rest upon a floor and surround a hot air register, and also open its rear side, so that such opening may be placed in opposition to a wall register, a door for such last opening, and an electric fan in the casing facing away from such last opening, an outlet opening being provided in the front wall of the casing in line with the fan.

A SECOND EXAMPLE, U.S. Pat. No. 2,135,461, Issued on Nov. 1, 1938, to Woolley teaches for use with a radiator positioned within an inclosure, a portable ventilating attachment comprising a casing having air ingress means at one end adapted for connection with a source of exterior air and having a depending conduit provided with air egress means at its lower end adapted for substantially coextensive engagement solely with and snugly around the top surface portion of the radiator in communication with the heat exchange passage thereof; and means for effecting intake of the exterior air to the casing, forced flow thereof through the casing, and discharge thereof at the location of engagement for passage over the heat exchange surfaces of the radiator.

A THIRD EXAMPLE, U.S. Pat. No. 4,576,331, Issued on Mar. 18, 1986, to Harwell teaches a booster fan and deflector for placing over a forced air heating/air conditioning floor vent to deliver more cool air in warm weather and more warm air in cold weather. The booster fan and deflector comprises a low profile plastic housing adapted to sit on a rectangular floor vent and blow air from the furnace air duct through a circular rotatable deflector on the top. A thermostatic switch is employed to automatically turn the fan motor on and off.

A FOURTH EXAMPLE, U.S. Pat. No. 4,870,253, Issued on Sep. 26, 1989, to De'Longhi teaches a mobile apparatus for heating rooms that has a radiator comprising a set of radiating elements inside which there flows a superior diathermal fluid, rigidly associated with a supporting body having at least one thermoventilation unit for the delivery of warm air from the body in a direction substantially orthogonal to the radiator.

A FIFTH EXAMPLE, U.S. Pat. No. DES. 314,613, Issued on Feb. 12, 1991, to De'Longhi shows the ornamental design for an mobile electric radiator.

A SIXTH EXAMPLE, U.S. Pat. No. 5,489,238, Issued on Feb. 6, 1996, to Asselbergs teaches a fan for increasing the air flow through a register that includes a housing having a closed top wall and side walls with air outlet openings therein. A bottom wall has air inlet openings for permitting air to enter from an air register into a fan chamber located within the housing. A centrifugal fan rotor is rotatably mounted in the fan chamber and directs air horizontally outwardly through the side vents in the register.

A SEVENTH EXAMPLE, U.S. Pat. No. 6,003,596, Issued on Dec. 21, 1999, to Barba teaches a cover for a steam radiator and for circulating air passing therepast. The cover includes a cover and blower apparatus. The cover covers the steam radiator. The blower apparatus is connected to the cover and circulates the air passing past the steam radiator. The blower apparatus includes a thermostat that is disposed in close proximity to the steam radiator, and extends therefrom to a blower fan, and activates the blower fan until the air becomes heated by the steam radiator to a predetermined temperature, which causes the air to be drawn in through intake vents in the front wall of the cover, up through an open top of the cover, into a main through opening in a bottom wall of a lid portion of the cover, downwardly out through a secondary through opening in the bottom wall of the lid portion, into an upper prismatic-frustrum-shaped funnel of the blower apparatus, into a lower prismatic-frustrum-shaped funnel of the blower apparatus, downwardly through an upper tube of the blower apparatus, into the blower fan, downwardly through a lower tube of the blower apparatus, forwardly into a manifold of the blower apparatus, and out outlet vents in the front wall of the cover.

AN EIGHTH EXAMPLE, U.S. Pat. No. 6,322,443 B1, Issued on Nov. 27, 2001, to Jackson teaches a booster fan assembly that includes a fan, an electric motor coupled to the fan, an electric cord coupled to the motor and adapted to be coupled to a source of electric power through a pair of thermostats and voltage reducing transformer, and a support coupled to the motor and adapted to be inserted in a heating/air conditioning duct from a distal end. The support has a flexible perimeter portion for contacting the interior surface of the duct and a central portion extending inward from the perimeter portion that is coupled to the motor. An outer surface of the support is selectively engageable with an interior surface of the duct at any selected location. The support is an incomplete ring that is collapsible from a first diameter to a second smaller diameter to permit insertion of the assembly into the duct. The support includes two inwardly directed handle portions normally spaced from each other, the handle portions being compressible toward each other to cause contraction of the perimeter portion. The support includes an outer surface formed of a conformable material for gripping the interior surface of the duct. The assembly is intended to be installed in a duct behind a register so that it is substantially invisible.

A NINTH EXAMPLE, U.S. Patent Office Document No. 2004/0222309 A1, Published on Nov. 11, 2004, to Skertich teaches a portable air circulator which rests on top of a radiator having a plurality of fins that are filled with a heated fluid. The air circulator has a casing and a fan. The casing includes a tray member which rests on top of the radiator fins and has a vent section with an opening facing the fins. A cap member of the casing forms a chamber with the tray member leading to the fan. The vanes of the fan direct a current of air from the cap member's vent portion through the vent section in the tray member at the radiator fins.

It is apparent now that numerous innovations for radiator accessories have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an apparatus for efficiently distributing warm air generated by a steam radiator that avoids the disadvantages of the prior art.

ANOTHER OBJECT of the present invention is to provide an apparatus for efficiently distributing warm air generated by a steam radiator that is simple and inexpensive to manufacture.

STILL ANOTHER OBJECT of the present invention is to provide an apparatus for efficiently distributing warm air generated by a steam radiator that is simple to use.

BRIEFLY STATED, STILL YET ANOTHER OBJECT of the present invention is to provide an apparatus for efficiently distributing warm air generated by a steam radiator which comprises a booster fan assembly positioned adjacent to the steam radiator. A mechanism is coupled to the booster fan assembly for circulating the warm air away from the steam radiator and out into a room.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 5 is a diagrammatic perspective view of the present invention per se with the flexible air ducts omitted therefrom;

FIG. 5A is an enlarged diagrammatic elevational view, with parts broken away taken in the direction of arrow 5A in FIG. 5, showing a control switch, an associated temperature sensing element and an electrical plug;

FIG. 6 is a diagrammatic cross sectional view taken on line 6-6 in FIG. 5 showing the booster fan assembly configured for use in FIG. 2;

FIG. 7 is a diagrammatic cross sectional view taken on line 7-7 in FIG. 5 showing the booster fan assembly configured for use in FIG. 3;

FIG. 8 is a diagrammatic cross sectional view taken on line 8-8 in FIG. 5 showing the booster fan assembly configured for use in FIG. 4;

FIG. 11 is an enlarged diagrammatic perspective view of the area enclosed in the dotted curve indicated by arrow 11 in FIG. 5, showing the control switch in greater detail.

Figure 1:
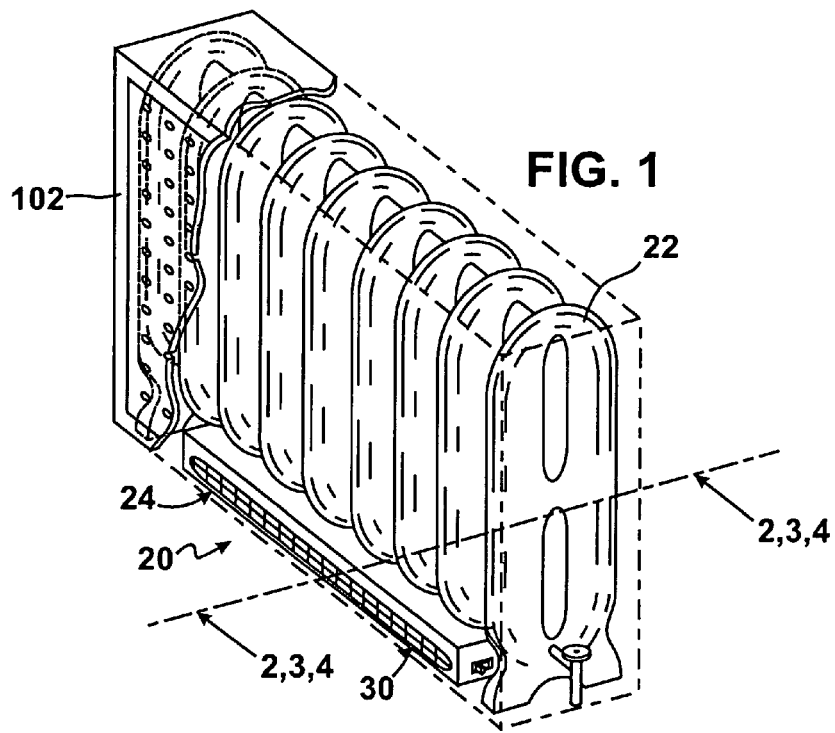
FIG. 1 is a diagrammatic perspective view showing the present invention installed in the warm air path of a steam radiator with the radiator cover broken away and in phantom.

A MARSHALLING OF REFERENCE NUMERALS UTILIZED IN THE DRAWING 20 apparatus
22 steam radiator
24 booster fan assembly of apparatus 20
26 warm air circulating mechanism of apparatus 20
28 room
30 casing of booster fan assembly 24
32 bottom wall of casing 30
34 rear wall of casing 30
36 front wall of casing 30
38 top wall of casing 30
40 end wall of casing 30
42 end wall of casing 30
44 front warm air passage port in front wall 36
46 grill removable from front wall 36
48 top perforated knock out plug on top wall 38
50 top warm air passage port in top wall 38
52 rear perforated knock out plug on rear wall 34
54 rear warm air passage port in rear wall 34
56 straight conduit in casing 30
58 Y-shaped conduit in casing 30
60 centrifugal blower of booster fan assembly 24
62 output housing of centrifugal blower 60
64 centrifugal fan blade of centrifugal blower 60
66 first pulley connected to centrifugal fan blade 64
68 motor of centrifugal blower 60
70 second pulley connected to motor 68
72 belt of centrifugal blower 60
74 mounting opening in top wall 38
76 recessed mounting flange in mounting opening 74
78 threaded aperture in mounting flange 76
80 brace of centrifugal blower 60
82 mounting plate of centrifugal blower 60
84 hole in mounting plate
85 mounting bolt of centrifugal blower 60
86 electric circuit of apparatus 20
88 transformer of electric circuit 86
90 electrical plug of electric circuit 86
92 control switch of electric circuit 86
94 temperature sensing element of electric circuit 86
96 elongated L-shaped tool for control switch 92
98 first flexible air duct of warm air circulating mechanism 26

100 second flexible air duct of warm air circulating mechanism 26
102 radiator cover
104 wall

DETAILED DESCRIPTION OF THE PREFERRED EMBODIMENT

Reffering now to the figures, in which like numerals indicate like parts, and particularly to FIGS. 1 through 12, in which the various components of the present invention are illustrated, and as such, will be discussed with reference thereto.

The present invention is an apparatus 20 for efficiently distributing warm air generated by a steam radiator 22 which comprises a booster fan assembly 24 positioned adjacent to the steam radiator 22. A mechanism 26 is coupled to the booster fan assembly 24 for circulating the warm air away from the steam radiator 22 and out into a room 28.

As best shown in FIGS. 5 through 8, the booster fan assembly 24 comprises a casing 30 having a bottom wall 32, a rear wall 34, a front wall 36, a top wall 38 and a pair of end walls 40, 42. The casing 30 further comprises the front wall 36 having a front warm air passage port 44 and a grill 46 removable from the front warm air passage port 44 in the front wall 36.

The top wall 38 of the casing 30 comprises a top perforated knock out plug 48. When the top perforated knock out plug 48 is removed from the top wall 38, a top warm air passage port 50 is formed in the top wall 38. The rear wall 34 of the casing 30 comprises a rear perforated knock out plug 52. When the rear perforated knock out plug 52 is removed from the rear wall 34, a rear warm air passage port 54 is formed in the rear wall 34.

The casing 30 further comprises a straight conduit 56 connected to and extending inwardly from the front warm air passage port 44 in the front wall 36 of the casing 30. The casing 30 further comprises a Y-shaped conduit 58 connected to and extending inwardly from the top warm air passage port 50 in the top wall 38 of the casing 30 and the rear warm air passage port 54 in the rear wall 34 of the casing 30.

Figure 9:
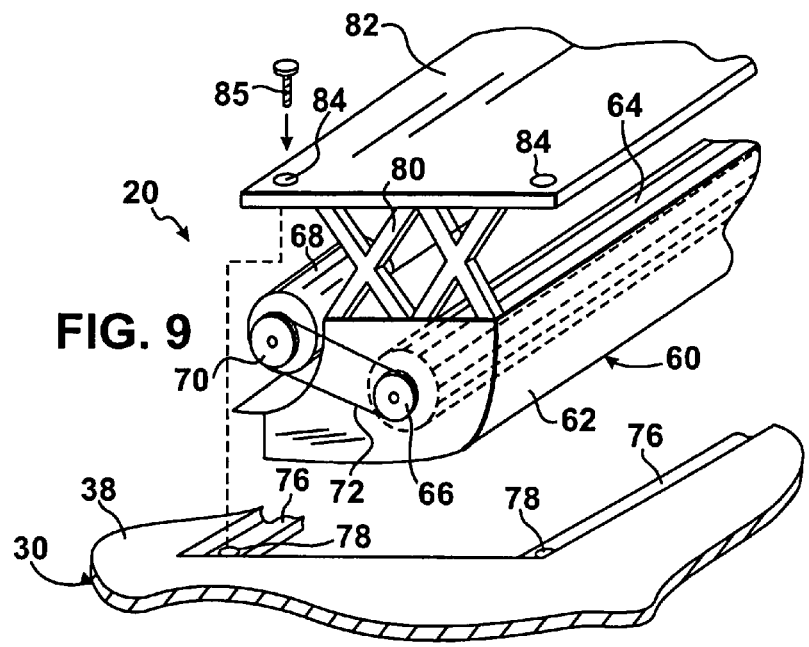
FIG. 9 is an enlarged exploded diagrammatic perspective view, with parts broken away and in section, showing how the centrifugal blower is installed in the top panel of the casing of the booster fan assembly.

The booster fan assembly 24 further comprises a centrifugal blower 60 therein. The centrifugal blower 60, as best seen in FIG. 9, comprises an output housing 62. A centrifugal fan blade 64 is rotatably mounted in the output housing 62. A first pulley 66 is connected to one end of the centrifugal fan blade 64. A motor 68 is mounted onto the output housing 62. A second pulley 70 is connected to the motor 68. A belt 72 extends about the first pulley 66 and the second pulley 70, wherein operation of motor 68 will cause the centrifugal fan blade 64 to rotate.

The top wall 38 of the casing 30 further comprises a mounting opening 74 therethrough. A pair of oppositely positioned recessed mounting flanges 76 are in the mounting opening 74. Each mounting flange 76 has a plurality of threaded apertures 78 therethrough. The centrifugal blower 60 further comprises a brace 80 affixed onto a top edge of the output housing 62. A mounting plate 82 is of a size to fit into the mounting opening 74 in the top wall 38 of the casing 60. The mounting plate 82 has a plurality of holes 84 therethrough. A bottom surface of the mounting plate 82 is attached to the brace 80, so as to form an air space between the mounting plate 82 and the top edge of the output housing 62. A plurality of mounting bolts 85 are provided. Each mounting bolt 85 will extend through one hole 84 in the mounting plate 82 and into one threaded aperture 78 in one mounting flange 76. In a first position the output housing 62 of centrifugal blower 60 can engage with a free end of the straight conduit 56 within the casing 60. In a second position the output housing 62 of the centrifugal blower 60 can engage with a free end of the Y-shaped conduit 58 within the casing 60.

Figure 12:
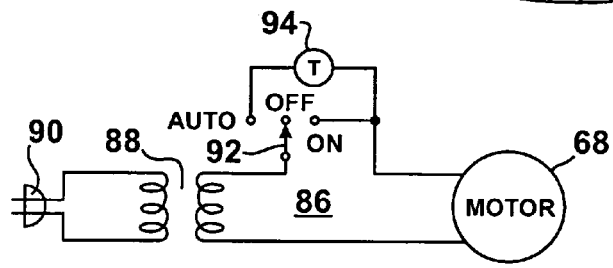
FIG. 12 is a schematic diagram of the electrical circuit of the present invention.
Figure 10:
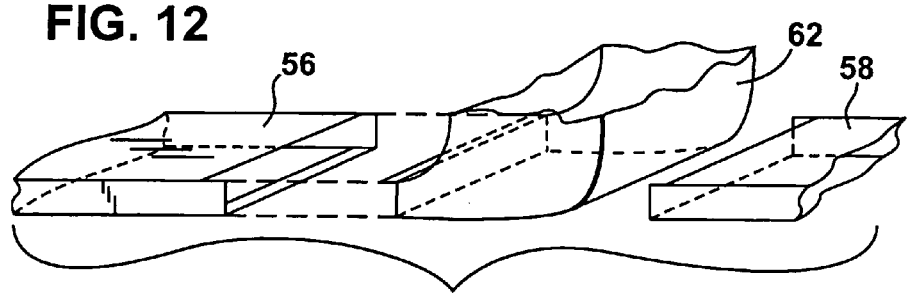
FIG. 10 is an enlarged diagrammatic perspective view showing how the output housing of the centrifugal blower can connect with the straight conduit within the casing of the booster fan assembly.

As shown in FIG. 12, the apparatus 20 further comprises an electric circuit 86 carried within the casing 60. A voltage reducing transformer 88 is connected to the electric circuit 86 within the casing 60. An electrical plug 90 is connected to a primary of the electric circuit 86 remote from the transformer 88. The plug 90 is adapted to be inserted into a standard wall outlet of electric power (not shown). A three position control switch 92 is mounted to one side wall 40 of the casing 30 and is electrically connected between the transformer 88 and the motor 68 of the centrifugal blower 60. A temperature sensing element 94 is electrically connected between the control switch 92 and the motor 68. The temperature sensing element 94 is located remote from the casing 30 in close proximity to the steam radiator 22. When the control switch 92 is manually moved to an on position, the motor 68 will continuously run. When the control switch 32 is manually moved to an auto position, the temperature sensing element 94 will cause the motor 68 to run until the air becomes heated by the steam radiator 22 to a predetermined temperature. When the control switch 92 is manually moved to an off position, the motor 68 will not run. As shown in FIG. 11, the control switch 92 can be manually moved by an elongated L-shaped tool 96.

Figure 2:
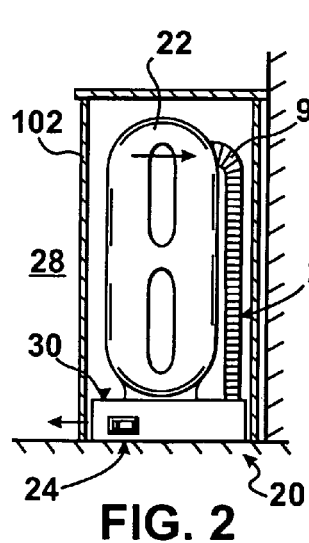
FIG. 2 is a diagrammatic cross sectional view taken on line 2-2 of FIG. 1 illustrating the present invention being installed in the warm air path under the steam radiator.
Figure 3:
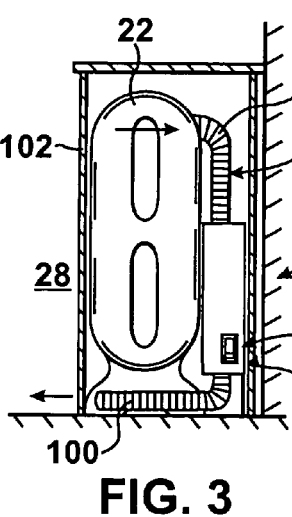
FIG. 3 is a diagrammatic cross sectional view taken on line 3-3 of FIG. 1 illustrating the present invention being installed in the warm air path behind the steam radiator with warm air flowing out under the steam radiator.
Figure 4:
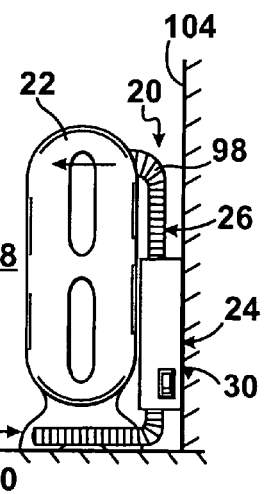
FIG. 4 is a diagrammatic cross sectional view taken on line 4-4 of FIG. 1 illustrating the present invention being installed in the warm air path behind the steam radiator with warm air flowing in under the steam radiator, and the radiator cover removed therefrom.

The warm air circulating mechanism 26 comprises a pair of flexible air ducts 98, 100. In a first arrangement, as shown in FIGS. 2 and 6, the booster fan assembly 24 is placed under the steam radiator 22, with the output housing 62 of the centrifugal blower 60 in engagement with the free end of the straight conduit 56. The first flexible air duct 98 is connected between the top warm air passage port 50 in the top wall 38 of the casing 30 and a top end of the steam radiator 22 with a radiator cover 102 placed over the steam radiator 22, allowing the warm air to exit from the grill 46 on front wall 60 of the casing 30. In a second arrangement, as shown in FIGS. 3 and 7, the booster fan assembly 24 is placed behind the steam radiator 22, with the output housing 62 of the centrifugal blower 60 in engagement with the free end of the straight conduit 56. The first flexible air duct 98 is connected between the rear warm air passage port 54 in the rear wall 34 of the casing 30 and a top end of the steam radiator 22. The second flexible air duct 100 is connected to the front warm air passage port 44 of the front wall 36 of the casing 30 after the grill 46 is removed from the front wall 36 of the casing 30. The second flexible air duct 100 extends under the steam radiator 22 with the radiator cover 102 placed over the steam radiator 22, allowing the warm air to exit from the second flexible air duct 100. In a third arrangement, as shown in FIGS. 4 and 8, the booster fan assembly 24 is placed between the steam radiator 22 and a wall 104, with the output housing 62 of the centrifugal blower 60 in engagement with the free end of the Y-shaped conduit 58. The first flexible air duct 98 is connected between the rear warm air passage port 54 in the rear wall 34 of the casing 30 and a top end of the steam radiator 22. The second flexible air duct 100 is connected to the front warm air passage port 44 of the front wall 36 of the casing 30, when the grill 46 is removed from the front wall 36 of the casing 30. The second flexible air duct 100 extends under the steam radiator 22 with the radiator cover 102 removed therefrom, allowing the warm air to exit from the top of the steam radiator 22.

It will be understood that each of the elements described above, or two or more together, may also find a useful application in other types of constructions differing from the types described above.

While the invention has been illustrated and described as embodiments of an apparatus for efficiently distributing warm air generated by a steam radiator, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An apparatus for efficiently distributing warm air generated by a steam radiator which comprises:
   a) a booster fan assembly positioned adjacent to the steam radiator; and
   b) means coupled to said booster fan assembly for circulating the warm air away from the steam radiator and out into a room, wherein said booster fan assembly comprises a casing having a bottom wall, a rear wall, a front wall, a top wall and a pair of end walls, wherein said casing further comprises said front wall having a front warm air passage port and a grill removable from said front warm air passage port in said front wall, wherein said top wall of said casing comprises a top perforated knock out plug, wherein when said top perforated knock out plug is removed from said top wall, a top warm air passage port is formed in said top wall, wherein said rear wall of said casing comprises a rear perforated knock out plug, wherein when said rear perforated knock out plug is removed from said rear wall, a rear warm air passage port is formed in said rear wall, wherein said casing further comprises a straight conduit connected to and extending inwardly from said front warm air passage port in said front wall of said casing, whereby said casing further comprises a Y-shaped conduit connected to and extending inwardly from said top warm air passage port in said top wall of said casing and said rear warm air passage port in said rear wall of said casing.

2. The apparatus as recited in claim 1, wherein said booster fan assembly further comprises a centrifugal blower therein.

3. The apparatus as recited in claim 2, wherein said centrifugal blower comprises:
   a) an output housing;
   b) a centrifugal fan blade rotatably mounted in said output housing;
   c) a first pulley connected to one end of said centrifugal fan blade;
   d) a motor mounted onto said output housing;
   e) a second pulley connected to said motor; and
   f) a belt extending about said first pulley and said second pulley, wherein operation of said motor will cause said centrifugal fan blade to rotate.

4. The apparatus as recited in claim 3, wherein said top wall of said casing further comprising:
   a) a mounting opening therethrough; and
   b) a pair of oppositely positioned recessed mounting flanges in said mounting opening, with each said mounting flange having a plurality of threaded apertures therethrough.

5. The apparatus as recited in claim 4, wherein said centrifugal blower further comprises:
   a) a brace affixed onto a top edge of said output housing;
   b) a mounting plate being of a size to fit into said mounting opening in said top wall of said casing, said mounting plate having a plurality of holes therethrough, wherein a bottom surface of said mounting plate is attached to said brace, so as to form an air space between said mounting plate and said top edge of said output housing; and
   c) a plurality of mounting bolts, in which each said mounting bolt will extend through one said hole in said mounting plate and into one said threaded aperture in one said mounting flange, so that in a first position said output housing of said centrifugal blower can engage with a free end of said straight conduit within said casing and in a second position said output housing of said centrifugal blower can engage with a free end of said Y-shaped conduit within said casing.

6. The apparatus as recited in claim 5, further comprising:
   a) an electric circuit carried within said casing;
   b) a voltage reducing transformer connected to said electric circuit within said casing;
   c) an electrical plug connected to a primary of said electric circuit remote from said transformer, wherein said plug is adapted to be inserted into a standard wall outlet of electric power;
   d) a three position control switch mounted to one said side wall of said casing and electrically connected between said transformer and said motor of said centrifugal blower; and
   e) a temperature sensing element electrically connected between said control switch and said motor, wherein said temperature sensing element is located remote from said casing in close proximity to the steam radiator, whereby when said control switch is manually moved to an on position, said motor will continuously run, when said control switch is manually moved to an auto position, said temperature sensing element will cause said motor to run until the air becomes heated by the steam radiator to a predetermined temperature, and when said control switch is manually moved to an off position said motor will not run.

7. The apparatus as recited in claim 6, wherein said warm air circulating means comprises a pair of flexible air ducts, so that in a first arrangement said booster fan assembly is placed under the steam radiator, with said output housing of said centrifugal blower in engagement with the free end of said straight conduit, so that said first flexible air duct is connected between said top warm air passage port in said top wall of said casing and a top end of the steam radiator with a radiator cover placed over the steam radiator, allowing the warm air to exit from said grill on said front wall of said casing, in a second arrangement said booster fan assembly is placed behind the steam radiator, with said output housing of said centrifugal blower in engagement with the free end of said straight conduit, so that said first flexible air duct is connected between said rear warm air passage port in said rear wall of said casing and a top end of the steam radiator, while said second flexible air duct is connected to said front warm air passage port of said front wall of said casing after said grill is removed from said front wall of said casing, wherein said second flexible air duct extends under the steam radiator with the radiator cover placed over the steam radiator, allowing the warm air to exit from said second flexible air duct, and in a third arrangement said booster fan assembly is placed between the steam radiator and a wall, with said output housing of said centrifugal blower in engagement with the free end of said Y-shaped conduit, so that said first flexible air duct is connected between said rear warm air passage port in said rear wall of said casing and a top end of the steam radiator, while said second flexible air duct is connected to said front warm air passage port of said front wall of said casing when said grill is removed from said front wall of said casing, wherein said second flexible air duct extends under the steam radiator with the radiator cover removed therefrom, allowing the warm air to exit from the top of the steam radiator.

* * * * *